(12) United States Patent
Kanagala et al.

(10) Patent No.: US 7,961,098 B2
(45) Date of Patent: Jun. 14, 2011

(54) METHODS AND APPARATUS FOR A PERVASIVE LOCATIONING AND PRESENCE-DETECTION SYSTEM

(75) Inventors: Sameer Kanagala, San Calos, CA (US);
Kamran Khojasteh, Morgan Hill, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 389 days.

(21) Appl. No.: 11/848,915

(22) Filed: Aug. 31, 2007

(65) Prior Publication Data
US 2011/0109452 A9     May 12, 2011

Related U.S. Application Data

(60) Provisional application No. 60/843,139, filed on Sep. 8, 2006.

(51) Int. Cl.
*G08B 13/00*        (2006.01)

(52) U.S. Cl. ............... 340/572.1; 340/10.1; 340/10.5
(58) Field of Classification Search ............ 340/539.13
See application file for complete search history.

(56) References Cited

U.S. PATENT DOCUMENTS

| | | | |
|---|---|---|---|
| 6,920,330 B2 * | 7/2005 | Caronni et al. | 455/456.1 |
| 2005/0030160 A1 * | 2/2005 | Goren et al. | 340/10.5 |
| 2007/0103303 A1 * | 5/2007 | Shoarinejad | 340/572.1 |
| 2008/0088452 A1 * | 4/2008 | Agrawal et al. | 340/572.1 |
| 2009/0115609 A1 * | 5/2009 | Weaver | 340/572.1 |

* cited by examiner

*Primary Examiner* — Travis R Hunnings

(57) ABSTRACT

A locationing system for use in a wireless network generally includes a wireless switch and a global positioning system (GPS) located proximate to or integrated into the wireless switch such that it communicates GPS data to the wireless switch. At least one access port (AP) is coupled to the wireless switch. At least one RFID reader (mobile and/or fixed) is configured to communicate with the access port, and the RFID reader is configured to read an RFID tag and communicate RFID tag data to the wireless switch. The wireless switch is configured to determine the location of the RFID tag utilizing the GPS data and the RFID tag data.

8 Claims, 1 Drawing Sheet

METHODS AND APPARATUS FOR A PERVASIVE LOCATIONING AND PRESENCE-DETECTION SYSTEM

CROSS-REFERENCE TO RELATED APPLICATIONS

This application claims priority to U.S. Prov. Pat. No. 60/843,139, filed Sep. 8, 2006.

TECHNICAL FIELD

The present invention generally relates to wireless local area networks (WLANs) and, more particularly, an improved wireless switch platform with locationing and presence-detection.

BACKGROUND

There has been a dramatic increase in demand for mobile connectivity solutions utilizing various wireless components and wireless local area networks (WLANs). This generally involves the use of wireless access points that communicate with mobile devices using one or more RF channels (e.g., in accordance with one or more of the IEEE 802.11 standards).

Wireless switching systems are used in connection with access ports and/or access points that communicate wirelessly with associated mobile units. Known wireless switching systems are unsatisfactory in a number of respects, and it is thus desirable to provide improved systems for controlling wireless devices. For example, it is difficult to determine the location of assets and objects (e.g., RFID tags, access ports, mobile units, switches, and the like) within an environment. Prior attempts at addressing this issue have centered on expensive and impractical products such as smart tags and GPS-enabled cell phones and/or PDAs. The desirable features and characteristics of the present invention will become apparent from the subsequent detailed description and the appended claims, taken in conjunction with the accompanying drawings and the foregoing technical field and background.

BRIEF SUMMARY

Improved locationing is provided by integrating global positioning system (GPS) data and RFID tag data within a wireless switch. A locationing system for use in a wireless network generally includes a wireless switch and a GPS located proximate to or integrated into the wireless switch such that it communicates GPS data to the wireless switch. At least one access port (AP) is coupled to the wireless switch. At least one RFID reader (mobile and/or fixed) is configured to communicate with the access port, and the RFID reader is configured to read an RFID tag and communicate RFID tag data to the wireless switch. The wireless switch is configured to determine the location of the RFID tag utilizing the GPS data and the RFID tag data.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

Figure 1:
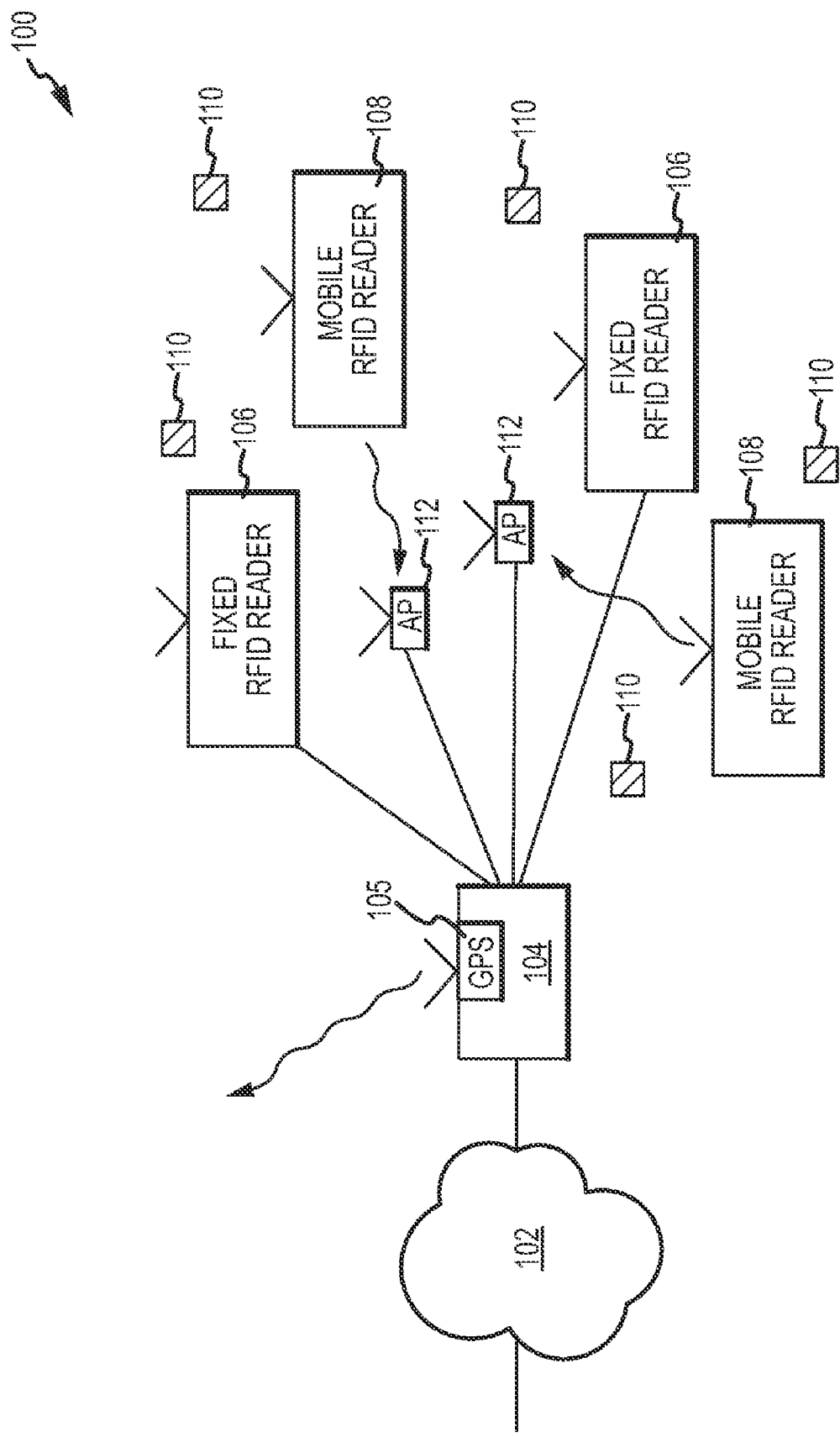
FIG. 1 is a hardware block diagram in accordance with one embodiment of the present invention.

The present invention relates to systems and methods for improved locationing and presence-detection in a wireless network. In this regard, the following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of data transmission and data formatting protocols and that the system described herein is merely one example embodiment of the invention.

For the sake of brevity, conventional techniques related to signal processing, data transmission, signaling, network control, the 802.11 family of specifications, wireless networks, RFID systems and specifications, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. The term "exemplary" is used in the sense of "example," rather than "model." Although the figures may depict example arrangements of elements, additional intervening elements, devices, features, or components may be present in an embodiment of the invention.

The present invention relates to a wireless switching device that includes various advantageous locationing features. In this regard, FIG. 1 depicts a schematic block diagram of an exemplary system 100, including a network 102 (e.g., a LAN, the Internet, etc.) coupled to a network switch 104. Switch 104 is also suitably coupled to one or more fixed RFID readers 106 and one or more mobile RFID readers 108, wherein readers 106 and 108 are configured to read RFID tags 110 (active and/or passive RFID tags) located throughout the environment. These tags 110 may be attached to any device, asset, or object.

Mobile readers 108, in the illustrated embodiment, communicate with switch 104 through one or more access ports or access points 112—e.g., in accordance with an 802.11 communication protocol. Tags 110, which may be of various types, are read by a RFID readers (or simply "readers") 108 and 106 having one or more associated antennas provided within the environment. The term "RFID" is not meant to limit the invention to any particular type of tag. The term "tag" refers, in general, to any RF element that can be communicated with and has an ID (or "ID signal") that can be read by another component. Readers 106, 108, are suitably connective via wired or wireless data links to a switch 104.

Switch 104 includes hardware, software, and/or firmware capable of carrying out the functions described herein. Thus, switch 104 may comprise one or more processors accompanied by storage units, displays, input/output devices, an operating system, database management software, networking software, and the like. Such systems are well known in the art, and need not be described in detail.

Switch 104 may be configured as a general purpose computer, a network switch, or any other such network host. In a preferred embodiment, controller or switch 104 is modeled on a network switch architecture but includes RF network controller software (or "module") whose capabilities include, among other things, the ability to allow configure and monitor readers 106, 108 and associated antennas. Switch 104 might generally include a locationing engine as well as a variety of other components—e.g., a cell controller (CC) and an RFID network controller (RNC) (not shown). The RNC includes hardware and software configured to handle RFID data communication and administration of the RFID network components, while the CC includes hardware and software configured to handle wireless data (e.g., in accordance with IEEE 802.11) from the mobile units and access ports within wireless cells.

In addition to handling communication of data packets in accordance with known methods, switch 104 also includes a global positioning system (GPS) unit 105 that communicates with an external GPS satellite system (not shown) to determine its own position. Thus, switch 104 is a GPS-enabled switch, and can communicate its location information to any other host or system on the network, including any enterprise software services running on the network. GPS 105 may be proximate to or integral with switch 104 (e.g., located within the same housing, or the like).

Switch 104 may support any number of tags 110 that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

The illustrated embodiment provides both locationing (i.e., determining the precise GPS-based location of an object) as well as presence detection (i.e., determining whether an object is present). Switch 104 interrogates and has access to RFID tag data from one or more of the tags 110 scanned.

The location of fixed RFID readers 106 is preferably known ahead of time. In this way, the switch may compensate for the location of the individual RFID readers relative to itself by using the known offset for fixed RFID readers 106 and the currently associated AP 112 offset for the mobile RFID readers 108.

Determining the location of the various components of the system may also include using a variety of techniques, including triangulation, trilateration, and the like. In this way, pervasive and ubiquitous GPS-based locationing is provided with a single GPS-enabled switch 104. Thus, locationing may be performed in any convenient manner, including the use of triangulation based on signal strength (RSSI method, known in the art), the use of "near-me" RFID tags, or the like. In the triangulation method, for example, the signal strength of components communicating with each AP 112 is known a priori as the result of a suitable reporting mechanism, and this data can be used to map tags 110. In this way, the existing RFID infrastructure in an organization may remain unaltered, and the tags 110 may be of the less-expensive passive type.

Thus, what has been described are systems and methods that utilize GPS to provide geographical location information to business applications in order to locate the objects on a floor plan. This allows, for example, faulty shipments to be tracked, and alerts to be generated if certain SKUs are in the wrong location (in terms of export controls, grey markets, regulatory status, etc.) It also allows, for example, equipment and car rental companies to globally track their assets.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention and the legal equivalents thereof.

The invention claimed is:

1. A locationing system for use in a wireless network, the system comprising:
    a wireless switch;
    a global positioning system (GPS) integral with the wireless switch and configured to communicate GPS data to the wireless switch;
    at least one access port (AP) coupled to the wireless switch; and
    at least two RFID readers configured to communicate with the at least one access port, each of the two RFID readers configured to read an RFID tag and communicate RFID tag data to the wireless switch, wherein the at least two RFID readers include a mobile RFID reader and a fixed RFID reader, the fixed RFID reader having a known location;
    wherein the wireless switch is configured to determine the location of the RFID tag utilizing the GPS data and at least one of the known location of the fixed RFID reader and a known offset distance between the access port and the mobile RFID reader.

2. The locationing system of claim 1, wherein the RFID tag is a passive tag.

3. A wireless switch comprising:
    a processor configured to receive RFID tag data from an access port, a mobile RFID reader, and a fixed RFID reader, the fixed RFID reader having a known location;

a global positioning system (GPS) integral with the wireless switch and communicatively coupled to the processor;

wherein the processor is configured to communicate GPS data to the wireless switch, and wherein the wireless switch is configured to determine the location of the RFID tag utilizing the GPS data and at least one of a known location of the fixed RFID reader and a known offset distance between the access port and the mobile RFID reader.

4. The wireless switch of claim 3, wherein the wireless switch is configured to receive the RFID tag data from a mobile RFID reader and a fixed RFID reader having a known location, and wherein the wireless switch is further configured to determine the location of the RFID tag using the known location of the fixed RFID reader.

5. The wireless switch of claim 4, wherein the wireless switch is further configured to determine the location of the RFID tag using a known offset distance associated with the access port and the mobile RFID reader.

6. The wireless switch of claim 3, wherein the wireless switch is configured to receive RFID tag data from a passive RFID tag.

7. A locationing method comprising:
providing a wireless switch within an environment;
providing a fixed RFID reader within the environment, the fixed RFID reader having a known location;
providing a mobile RFID reader within the environment;
providing an access port coupled to the wireless switch;
providing a global positioning system (GPS) integral with the wireless switch and configured to communicate GPS data to the wireless switch;
receiving RFID tag data associated with an RFID tag from the fixed RFID reader and the mobile RFID reader;
receiving the GPS data; and
determining the location of the RFID tag utilizing the GPS data, the RFID tag data, and at least one of the known location of the fixed RFID reader and a known offset distance between the mobile RFID reader and the access port.

8. The method of claim 7, wherein the location of the RFID tag is sent to an enterprise application over the network, and wherein the enterprise application is configured to track the location geographically and display the location to a user.

* * * * *